(12) United States Patent
Zhang

(10) Patent No.: US 8,523,993 B2
(45) Date of Patent: Sep. 3, 2013

(54) METHOD FOR IMPROVING VISCOSITY OF THICKENERS FOR AQUEOUS SYSTEMS

(75) Inventor: Lifeng Zhang, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1809 days.

(21) Appl. No.: 10/677,436

(22) Filed: Oct. 2, 2003

(65) Prior Publication Data

US 2004/0072800 A1    Apr. 15, 2004

Related U.S. Application Data

(60) Provisional application No. 60/417,854, filed on Oct. 11, 2002.

(51) Int. Cl.

| | | |
|---|---|---|
| C08L 5/16 | (2006.01) | |
| C08L 61/26 | (2006.01) | |
| C08L 61/32 | (2006.01) | |
| C08B 37/16 | (2006.01) | |
| C09D 105/16 | (2006.01) | |
| C09D 161/32 | (2006.01) | |

(52) U.S. Cl.
USPC .................. 106/162.1; 106/206.1; 524/48

(58) Field of Classification Search
USPC ........................... 524/48; 106/217
See application file for complete search history.

(56) References Cited

U.S. PATENT DOCUMENTS

| | | | |
|---|---|---|---|
| 4,079,028 A | 3/1978 | Emmons et al. | |
| 4,746,734 A * | 5/1988 | Tsuchiyama et al. | 536/103 |
| 5,023,309 A | 6/1991 | Kruse et al. | |
| 5,137,571 A | 8/1992 | Eisenhart et al. | |
| 5,354,808 A * | 10/1994 | Onwumere et al. | 524/837 |
| 5,376,709 A | 12/1994 | Lau et al. | |
| 5,425,806 A | 6/1995 | Doolan et al. | |
| 5,521,266 A * | 5/1996 | Lau | 526/200 |
| 5,914,373 A * | 6/1999 | Glancy et al. | 525/406 |
| 6,002,049 A | 12/1999 | Wiggins et al. | |
| 6,107,394 A | 8/2000 | Broadbent et al. | |
| 6,809,132 B2 | 10/2004 | Sau | |
| 6,887,928 B2 * | 5/2005 | Tanzer et al. | 524/386 |
| 6,900,255 B2 | 5/2005 | Sau | |
| 7,125,919 B2 * | 10/2006 | Harris et al. | 524/48 |
| 2002/0165313 A1 | 11/2002 | Tanzer | |
| 2003/0171459 A1 | 9/2003 | Sau | |
| 2005/0187342 A1 | 8/2005 | Schieferstein et al. | |

FOREIGN PATENT DOCUMENTS

| | | |
|---|---|---|
| EP | 0460896 | 12/1991 |
| EP | 0614950 | 9/1994 |
| EP | 0682094 A | 11/1995 |
| EP | 1236776 A | 9/2002 |
| WO | WO03037989 | 5/2003 |

OTHER PUBLICATIONS

Anderson et. al. Polymeric Materials Science and Engineering, 79, 1998, 411-412.*
Chan et. al., Scientia Horticulture, 114, 2007, 112-120.*
Zeying Ma et et al ; "Complexations of Beta-Cyclodextrin with Surfactants and Hydrophobically Modified Ethoxylated Urethanes"; ACS Symposium Series, vol. 765, 2000, pp. 254-270, XP008026121 USA.
Karlson L et al; "A rheological investigation of the complex formation between hydrophobically modified ethyl (hydroxy ethyl) cellulose and cyclodextrin"; Carbohydrate Polymers, Applied Science Publishers, Ltd. Barking, GB, vol. 50, No. 3; Nov. 15, 2002; pp. 219-226, XP004395899; ISSN, 01448617.

* cited by examiner

*Primary Examiner* — Leigh Maier
(74) *Attorney, Agent, or Firm* — Cantor Colburn LLP; Karl E. Stauss

(57) ABSTRACT

A composition for a reduced viscosity hydrophobic thickener system for thickening a polymer-containing aqueous system, a method for providing a reduced viscosity thickener system for a polymer-containing aqueous system, and a method for increasing the viscosity of a polymer-containing aqueous system are disclosed.

12 Claims, No Drawings

METHOD FOR IMPROVING VISCOSITY OF THICKENERS FOR AQUEOUS SYSTEMS

CROSS REFERENCE TO RELATED PATENT APPLICATIONS

This is a non-provisional application of prior pending U.S. provisional application Ser. No. 60/417,854 filed Oct. 11, 2002.

This invention relates to a composition for a reduced viscosity hydrophobic thickener system for thickening a polymer-containing aqueous system, a method for providing a reduced viscosity thickener system for a polymer-containing aqueous system, and a method for increasing the viscosity of a polymer-containing aqueous system.

Polymer-containing aqueous systems, such as for example coatings containing emulsion polymer binders, typically employ thickeners to obtain the desired degree of viscosity needed for the proper formulation and application of the aqueous system. One general type of thickener used in aqueous systems is referred to in the art by the term "associative." Associative thickeners are so called because the mechanism by which they thicken is believed to involve hydrophobic associations between the hydrophobic moieties on the thickener molecules themselves and/or with other hydrophobic surfaces. Certain types of associative thickener are typically sold as aqueous solutions containing organic cosolvents such as, for example propylene glycol and butyl carbital. The function of the organic cosolvent is to suppress the viscosity of the aqueous solution containing the associative thickener to allow for ease in its handling before its use as a thickener. A disadvantage of these organic cosolvents is that they possess potential environmental, safety and health disadvantages. Viscosity suppression may also be accomplished by the use of surfactants. While this presents no specific health/environmental hazard, it does degrade paint performance.

Others have achieved viscosity suppression of associative thickeners without the use of solvents. U.S. Pat. Nos. 5,137, 571, and 5,376,709 are directed to viscosity suppression of hydrophobically modified associative thickeners by mixing them with cyclodextrin-containing compounds which complex with the hydrophobic groups on the thickener. However, none of these references teach, disclose, or suggest methods to achieve such viscosity suppression in an efficient and cost-effective manner. Since cyclodextrin compounds are extremely costly, it is desirable to have a method for increasing the viscosity suppression efficiency of the cyclodextrin-containing compound, thus reducing the amount of cyclodextrin required to suppress the viscosity of a hydrophobically modified associative thickener.

Applicants have unexpectedly discovered that when suppressing the viscosity of a hydrophobically modified associative thickener by mixing the thickener with a cyclodextrin-containing compound, the viscosity suppression efficiency of the cyclodextrin-containing compound can be significantly improved by careful selection of the thickener phobe(s) and the cyclodextrin-containing compound. Applicants have further unexpectedly discovered that when the hydrophobically modified associative thickener is a polyethoxylated urethane thickener having at least one diisocyanate functional group, the viscosity suppression efficiency of the cyclodextrin-containing compound can be significantly improved by careful selection of the thickener phobe(s), the diisocyanate functional group(s), and the cyclodextrin-containing compound.

In a first aspect of the present invention, there is provided a composition for a reduced viscosity hydrophobic thickener system for thickening a polymer-containing aqueous system, said composition comprising: (a) a cyclodextrin-containing compound having a hydrophobic cavity of a predetermined size, and (b) a hydrophobically modified associative thickener containing at least one terminal phobe of a size capable of complexing with said hydrophobic cavity of said cyclodextrin-containing compound; and, wherein at least a portion of said cyclodextrin-containing compound is complexed with said hydrophobically modified associative thickener in such a way that at least a portion of at least one of said phobes at least partially fills said hydrophobic cavity.

In a second aspect of the present invention, there is provided a method for providing a a reduced viscosity thickener system for a polymer-containing aqueous system, the method comprising: (a) providing a cyclodextrin-containing compound having a hydrophobic cavity of a predetermined size; (b) providing a hydrophobically modified associative thickener containing at least one terminal phobe of a size capable of complexing with said hydrophobic cavity of said cyclodextrin-containing compound; (c) mixing said cyclodextrin-containing compound provided in step (a) and said hydrophobically modified associative thickener provided in step (b), such that at least a portion of said cyclodextrin-containing compound of step (a) is complexed with said hydrophobically modified associative thickener of step (b) in such a way that at least a portion of at least one of said phobes at least partially fills said cavity.

In a third aspect of the present invention, there is provided a method for increasing the viscosity of a polymer-containing system, comprising mixing the reduced viscosity thickener system prepared according to the method of the second aspect of the invention with: a polymer-containing aqueous system, wherein said polymer is water-insoluble; and a surfactant capable of decomplexing said cyclodextrin-containing compound from said hydrophobically modified associative thickener.

In a fourth aspect of the present invention, there is provided a method for providing a reduced viscosity thickener system for a polymer-containing aqueous system, the method comprising: (a) providing methyl-α-cyclodextrin having a hydrophobic cavity; (b) providing a hydrophobically modified associative thickener containing at least one terminal phobe of a size capable of complexing with said hydrophobic cavity of said methyl-α-cyclodextrin; (c) mixing said methyl-α-cyclodextrin provided in step (a) and said hydrophobically modified associative thickener provided in step (b), such that at least a portion of said methyl-α-cyclodextrin of step (a) is complexed with said hydrophobically modified associative thickener of step (b) in such a way that at least a portion of said phobes at least partially fills said cavity.

In a fifth aspect of the present invention, there is provided a method for increasing the viscosity of a polymer-containing aqueous system, comprising mixing the reduced viscosity thickener system prepared according to the method of the fourth aspect of the invention with: (a) a polymer-containing aqueous system, wherein said polymer is water-insoluble; and (b) a surfactant capable of decomplexing said methyl-α-cyclodextrin from said hydrophobically modified associative thickener.

The composition of the present invention is useful for a reduced viscosity hydrophobic thickener system capable of thickening a polymer-containing aqueous system. The composition contains a hydrophobically modified associative thickener, and a cyclodextrin-containing compound having a hydrophobic cavity.

The viscosity suppression of the hydrophobic thickener system is achieved by use of a cyclodextrin-containing compound in the composition of the invention. Cyclodextrins are produced from the starch of plants such as corn, potato, waxy maize, and the like. The starch may be modified or unmodified, derived from cereal, tubers, or the amylose or amylopectin fractions thereof. Cyclodextrins are usually made by liquifying an aqueous slurry of the selected starch containing up to about 35% by weight solids, by means of gelatination or by treatment with a liquefying enzyme such as bacterial α-amylase enzyme, and then subjecting the liquified starch to treatment with a transglycosylate enzyme to form the cyclodextrins.

Cyclodextrins are composed of glucopyranose units interconnected by α-(1-4) glycosidic linkages, which form a hollow cone or torus shape. The most common cylcodextrin compounds, α, β and γ-cyclodextrins, are cyclically closed oligosaccharides with 6, 7 or 8 glucoses per macrocycle respectively. The amount of individual α, β and γ-cyclodextrins will vary depending on the selected starch, the selected transglycolase enzyme, and the processing conditions. Precipitation and separation of the individual cyclodextrins is described in the literature using solvent systems, inclusion compounds such as trichloroethylene, and nonsolvent systems utilizing selected ion exchange resins: β-cyclodextrin is the most widely used form of cyclodextrin, and is known for use in the production of pharmaceuticals and foods. In addition to α, β and γ-cyclodextrins, modified cyclodextrins such as for example ethoxylated cyclodextrin, propoxylated cyclodextrin, methyl-α-cyclodextrin, methyl-β-cyclodextrin, and methyl-γ-cyclodextrin are useful for the present invention.

The torus structure of a cyclodextrin compound contains a central hydrophobic cavity. The size of a cyclodextrin compound's central hydrophobic cavity varies depending the type of cyclodextrin, and increases with the number of glucose units. For example, the diameter of the hydrophobic cavity of α-cyclodextrin (4.7-5.7 nm) is smaller than that of β-cyclodextrin (6.0-6.6 nm), which is smaller than that of γ-cyclodextrin (7.5-8.5 nm). The central cavity of a cyclodextrin compound can form inclusion complexes with hydrophobic compounds, greatly increasing their solubility. By "complex" herein is meant a molecular entity formed by loose association involving two or more component molecular entities, where the bonding between the components is weaker than a covalent bond. By "inclusion complex" herein is meant a complex in which one component (the host) forms a cavity in which molecular entities of a different component (the guest) are located. The ability of cyclodextrin compounds to form inclusion complexes with organic compounds and thereby increase the water solubility of the organic compound is known. In "Cyclodextrins Increase Surface Tension and Critical Micelle Concentrations of Detergent Solutions" by W. Saenger and A. Muller-Fahrnow, *Agnew. Chem. Int. Ed. Eg*$^3$ 27 (1988) No. 3 at pages 393-394, the authors discuss the ability of the central hydrophobic cavity of the cyclodextrin compounds to accommodate the hydrophobic, aliphatic part of a detergent molecule having a diameter of about 5 Angstroms. One type of hydrophobic species with which cyclodextrin compounds can form complexes is the hydrophobic moieties of associative thickeners. The cyclodextrin compound's hydrophobic cavity acts as a host, providing a location for the complexation of the hydrophobic parts of other chemical compounds (the guest), such as the terminal hydrophobic moieties of associative thickeners.

The strength with which the guest molecules complex with the host cyclodextrin cavity depends on how well the host-guest complex fits together. The guest molecules must satisfy the size criterion of fitting at least partially into the cyclodextrin internal cavity. Applicants have discovered that by carefully selecting the type of cyclodextrin-containing compound, and the size and/or configuration of the terminal hydrophobic portions of the thickener, the viscosity suppression efficiency of the cyclodextrin-containing compound can be improved. By "viscosity suppression efficiency" is meant herein the degree of effectiveness of the cyclodextrin-containing compound to maintain the viscosity of the thickener at the level desired, for example for ease of handling. Applicants have discovered that the better the fit of the terminal hydrophobic portions of the associative thickener in the cyclodextrin compound hydrophobic cavity, the higher the viscosity suppression efficiency of the cyclodextrin-containing compound. Thus, a host:guest ratio as low as 1:1 can be achieved by selection of a cyclodextrin compound having a predetermined cavity size and a thickener compound having terminal hydrophobic portions of a size and/or configuration such that they are capable of complexing with the hydrophobic cavity of the cyclodextrin compound.

In one embodiment of the present invention, the terminal hydrophobic portions of the associative thickener compound contain at least one terminal phobe. By "terminal phobe" herein is meant a hydrophobic group located at the end of the thickener compound. In this embodiment, the viscosity suppression efficiency of a cyclodextrin-containing compound is improved by utilizing a composition containing a cyclodextrin-containing compound having a hydrophobic cavity of a predetermined size and an associative thickener having at least one terminal phobe of a size capable of complexing with the hydrophobic cavity of the cyclodextrin containing compound. Optionally, the at least one associative thickener terminal phobe has a predetermined size. At least a portion of the cyclodextrin-containing-compound is complexed with the hydrophobically modified associative thickener in such a way that at least a portion of at least one of the phobes at least partially fills the cyclodextrin hydrophobic cavity. Any hydrophobically modified associative thickeners are useful for this embodiment of the invention. Examples of such thickeners include, for example, hydrophobically modified alkali soluble emulsions, hydrophobically modified hydroxyethyl cellulose, hydrophobically modified polyacrylamides, hydrophobically modified poly(acetal-polyethers), hydrophobically modified aminoplast-ether copolymers, hydrophobically modified non-urethane polymeric thickeners, and the like.

In a different embodiment of the present invention, the terminal hydrophobic portions of the associative thickener compound contain at least one terminal phobe and at least one diisocyanate functional group. In this embodiment, the viscosity suppression efficiency of a cyclodextrin-containing compound is improved by utilizing a composition containing a cyclodextrin-containing compound having a predetermined hydrophobic cavity size with a hydrophobically modified polyethoxylated urethane thickener having at least one terminal phobe of a size capable of complexing with the hydrophobic cavity of the cyclodextrin-containing compound, and at least one diisocyanate functional group having a size and configuration such that it is capable of complexing with the hydrophobic cavity of the cyclodextrin-containing compound. Optionally, the at least one hydrophobically modified polyethoxylated urethane thickener terminal phobe has a predetermined size, and/or the at least one diisocyanate functional group has a predetermined size and configuration.

The associative thickener of this embodiment is a hydrophobically modified polyethoxylated urethane thickener. Associative thickeners of this type are known in the art. Typically, they contain polyethylene glycol units of varying length, connected by urethane linkages, and terminated by hydrophobic end groups. The urethane linkages result from the reaction of a diisocyanate with an alcohol. Applicants have unexpectedly discovered that the configuration of the diisocanate used to make the thickener urethane linkage affects the viscosity suppression efficiency of a cyclodextrin-containing compound. The configuration of the at least one diisocyanate functional group is cyclic, branched chained, straight chained, or combinations thereof. Without being bound to any particular theory, it is believed that the viscosity suppression efficiency of the cyclodextrin increases with the increased flexibility of the diisocyanate chain. It is believed that the diisocyanate compensates for any lack of fit of the thickener's at least one terminal phobe in the hydrophobic cavity of the cyclodextrin-containing compound, by complexing with the cavity, along with the phobe. Therefore, the more flexible the diisocyanate chain, the better the diisocyanate is able to compensate for any deficiency in the fit of the phobe in the cyclodextrin cavity. Diisocyanates useful for the present invention include, for example 1,4-tetramethylene diisocyanate; 1,6-hexamethylene diisocyanate ("HDI"); 1,10-decamethylene diisocyanate; 2,2,4-trimethyl-1,6-diisocyanatohexane; 1,4-cyclohexylene diisocyanate; 4,4'-methylenebis(isocyanatocyclohexane) ("Des W"); 1-isocyanato-3-isocyanatomethyl-3,5,5-trimethylcyclohexane; 2,6- and 2,4-tolylene diisocyanate ("TDI"); m- and p-phenylene diisocyanate; xylene diisocyanate; 4-chloro-1,3-phenylene diisocyanate; 4,4'-biphenylene diisocyanate; 4,4'-methylene diphenylisocyanate ("MDI"); 1,5-naphthylene diisocyanate; and 1,5-tetrahydronaphthylene diisocyanate.

In this embodiment, at least a portion of the cyclodextrin-containing-compound is complexed with the hydrophobically modified associative thickener in such a way that at least a portion of at least one of the phobes and/or at least a portion of the diisocyanate functional group at least partially fills the cyclodextrin hydrophobic cavity.

The viscosity of the aqueous solution containing the associative thickener increases with increased thickener solids content. Therefore, the amount of cyclodextrin needed to suppress the viscosity of the associative thickener increases with the solids content of the thickener. The thickener solids level can be decreased to limit the amount of cyclodextrin required. Preferably, the solids level of the thickener is 15% to 25%, more preferably 16% to 20%.

The methods of the present invention relate to providing a reduced viscosity thickener system for a polymer-containing aqueous system, and methods of increasing the viscosity of a polymer-containing aqueous system using the reduced viscosity thickener system. The reduced viscosity thickener system provides for ease of handling of the associative thickener prior to use in the polymer-containing aqueous system it is intended to thicken.

In one embodiment of the invention, the thickener system is provided by mixing a hydrophobically modified associative thickener of the type described above with a cyclodextrin-containing compound having a hydrophobic cavity of a predetermined size, causing the thickener and cyclodextrin-containing compound to complex, thus providing the composition of the invention.

In a different embodiment of the invention, the cyclodextrin-containing compound is methyl-α-cyclodextrin. In this embodiment, the thickener system is provided by mixing a hydrophobically modified associative thickener of the type described above with methyl-α-cyclodextrin having a hydrophobic cavity, causing the thickener and methyl-α-cyclodextrin to complex, thus providing the composition of the invention. It is well known in the art that methyl-β-cyclodextrin can provide superior viscosity suppression as compared to hydroxyethyl cyclodextrin or hydroxypropyl cyclodextrin (see for example U.S. Pat. No. 5,376,709). However, applicants have discovered that in some cases, other cyclodextrins; such as methyl-α-cyclodextrin, can provide better viscosity suppression than even methyl-β-cyclodextrin. Without intending to be bound to a particular theory, it is believed that such superior viscosity suppression occurs where the terminal hydrophobic portion of the associative thickener has a size and/or configuration such that it fits well within the hydrophobic cavity of the particular cyclodextrin-containing compound, which may be methyl-α-cyclodextrin.

The efficiency with which an associative thickener is capable of thickening a polymer-containing aqueous system varies depending upon the type of thickener. Applicants have discovered that hydrophobically modified nonurethane thickeners tend to have a thickening efficiency equal to or better than that of hydrophobically modified polyethoxylated urethane thickeners, depending on the type of polyethoxylated urethane thickener. For example, nonurethane thickeners typically have a thickening efficiency equivalent to that of 1,6-hexamethylene diisocyanate ("HDI"), and better than that of 4,4'-methylenebis (isocyanatocyclohexane) ("Des W").

When the associative thickener used to make the composition of the invention is a hydrophobically modified polyethoxylated urethane thickener, the effective carbon size of the diisocyanate influences the thickening efficiency of the thickener. Therefore, mere substitution of, for example, a cyclic diisocyanate, by a straight chained diisocyanate will not result in an equivalent paint thickening efficiency. In order to achieve an equivalent thickening efficiency using different diisocyanates, it is necessary for each diisocyanate/terminal phobe combination to have the same effective carbon size. For example, the thickening efficiency of thickener 'A' having a cyclic diisocyanate, an effective carbon size if 10 in the urethane linkage, and bearing a terminal phobe having 10 carbons has a thickening efficiency equivalent to that of thickener 'B' having a straight chained diisocyanate, an effective carbon size if 6 in the urethane linkage, and bearing a terminal phobe having 14 carbons.

The ability to decomplex the cyclodextrin-containing compound from the hydrophobic associative thickener is just as important as the ability of the cyclodextrin-containing compound to complex with the associative thickener in the first instance. In order for the thickener to perform its intended viscosity increasing function in the aqueous system to which the associative thickener solution is added, it is critical that the cyclodextrin becomes decomplexed from the hydrophobic moieties on the associative thickener molecule. Cyclodextrin-containing compounds are readily decomplexed from hydrophobic associative thickeners simply by the addition of a material which has an affinity for the cyclodextrin. Conventional surface active agents commonly present in aqueous coating systems including, anionic surfactants such as sodium lauryl sulfate, nonionic surfactants such as IGEPAL®CO660 (a 10 mole ethoxylate of nonyl phenol), and cationic surfactants, may be used to decomplex the cyclodextrin. Other water soluble organic solvents such as for example ethanol and TEXANOL® solvent may also be employed for this purpose, but are not preferred. It is preferred to utilize about one mole of the decomplexing agent per mole of the cyclodextrin added to the associative thickener solution to achieve complete decomplexation.

Both the complexation and decomplexation mechanisms are easily achieved by the addition of the reactants with mixing. No special purification or separation steps are required at room temperature. While additional surfactant may be added, it is not necessary to add additional surfactant to cause the decomplexation process to occur; the formulation surfactants already present in the paint have been found to be sufficient.

Tha following examples are presented to illustrate the invention.

EXAMPLES 1-4

Four hydrophobically modified polyethoxylated urethane (HEUR) thickener samples were used in the test. Two of them were synthesized using 4,4'-methylene bis(isocyanatocyclohexane) (Des W) as the urethane linker. The other two samples used 1,6-hexamethylene diisocyanate (HDI) as the urethane linker. 5 grams of each thickener sample were mixed with 20 gram mixtures of water and methyl-β-cyclodextrin at different concentrations to form solutions of 20% HEUR solids. The low shear viscosity of each resultant solution was measured using a Brookfield viscometer. The viscosity at different cyclodextrin levels was normalized to the viscosity of the solution where no cyclodextrin was used. The results, which are summarized in Table 1, demonstrate that the methyl-β-cyclodextrin suppressed the viscosity of the hydrophobically modified polyethoxylated urethane thickener having HDI chemistry better than a hydrophobically modified polyethoxylated urethane thickener made with Des W chemistry.

TABLE 1

| | THICKENER NORMALIZED VISCOSITY | | | | |
| --- | --- | --- | --- | --- | --- |
| METHYL-β-CD WT % | HEUR1 w/ DES W (Ex 1) | HEUR2 w/ DES W (Ex 2) | HEUR3 w/ HDI (Ex 3) | HEUR4 w/ HDI (Ex 4) | THICKENER % SOLIDS |
| 0 (comparative) | 1 | 1 | 1 | 1 | 20 |
| 0.5 | 0.927 | 0.967 | 0.27 | 0.328 | 20 |
| 1 | 0.785 | 0.887 | 0.141 | 0.153 | 20 |
| 1.5 | 0.565 | 0.748 | 0.084 | 0.092 | 20 |
| 2 | 0.377 | 0.49 | 0.046 | 0.062 | 20 |
| 2.5 | 0.209 | 0.278 | 0.032 | 0.043 | 20 |
| 3 | 0.123 | 0.159 | 0.018 | 0.025 | 20 |
| 3.5 | 0.089 | 0.096 | 0.014 | 0.02 | 20 |

EXAMPLES 5-10

Four hydrophobically modified polyethoxylated urethane (HEUR) thickener samples were used in the test. Two of them was synthesized using Des W as the urethane linker, while the other two used HDI as the urethane linker. 4.5 to 5 grams of each thickener sample were mixed with 20 to 20.5 gram mixtures of water and methyl-β-cyclodextrin at various concentrations to form solutions of 18% HEUR solids and 20% HEUR solids. The low shear viscosity of each resultant solution was measured using a Brookfield viscometer. The results, which are summarized in Table 2, demonstrate that in thickener systems having different solids contents, the methyl-β-cyclodextrin suppressed the viscosity of the hydrophobically modified polyethoxylated urethane thickener having HDI chemistry better than the hydrophobically modified polyethoxylated urethane thickener made with Des W chemistry.

TABLE 2

| | THICKENER VISCOSITY (cps) | | | | | |
|---|---|---|---|---|---|---|
| METHYL-β-CD WT % | HEUR5 w/ DES W at 20% Solids (Ex 5) | HEUR3 w/ HDI at 20% Solids (Ex 6) | HEUR6 w/ DES W at 20% Solids (Ex 7) | HEUR7 w/ HDI at 20% Solids (Ex 8) | HEUR6 w/ DES W at 18% Solids (Ex 9) | HEUR7 w/ HDI at 18% Solids (Ex 10) |
| 0 (comparative) | 22700 | 44400 | 17200 | 21250 | 11000 | 14700 |
| 0.45 | | | | | 11300 | 6900 |
| 0.5 | 22600 | 12000 | 17800 | 9800 | | |
| 1 | 18450 | 6250 | 14400 | 5850 | 10100 | 4050 |
| 1.35 | | | | | 7800 | 2850 |
| 1.5 | 14200 | 3750 | 11500 | 4200 | | |
| 1.8 | | | | | 5250 | |
| 2 | 8900 | 2050 | 7750 | | | |
| 2.25 | | | | | 3700 | |
| 2.5 | 5300 | 1400 | 5250 | | | |
| 2.7 | | | | | 2300 | |
| 3 | 3500 | 800 | 3150 | | | |
| 3.5 | 1650 | 600 | | | | |

EXAMPLES 11-14

Two hydrophobically modified polyethoxylated urethane (HEUR) thickener samples were used in the test. One of them was synthesized using Des W as the urethane linker, while the other one used HDI as the urethane linker. 5 grams of each thickener sample were mixed with 20 gram mixtures of water and methyl-β-cyclodextrin at various concetrations to form solutions of 20% HEUR solids. Another 5 grams of each thickener sample were mixed with 20 gram mixtures of water and hydroxypropyl-β-cyclodextrin at various concetrations to form solutions of 20% HEUR solids. The low shear viscosity of each resultant solution was measured using a Brookfield viscometer. The results, which are summarized in Table 3, demonstrate that the cyclodextrin suppressed the viscosity of the hydrophobically modified polyethoxylated urethane thickener having HDI chemistry better than the hydrophobically modified polyethoxylated urethane thickener made with Des W chemistry, whether the cyclodextrin used was methyl-β-cyclodextrin or hydroxypropyl-β-cyclodextrin (PrOH-β-CD). The results also demonstrate that the methyl-β-cyclodextrin was more efficient in viscosity suppression than the hydroxypropyl-β-cyclodextrin.

EXAMPLES 15-18

Two hydrophobically modified polyethoxylated urethane (HEUR) thickener samples were used in the test. One of them was synthesized using Des W as the urethane linker, while the other one used HDI as the urethane linker. 5 grams of each thickener sample were mixed with 20 gram mixtures of water and methyl-β-cyclodextrin at various concentrations to form solutions of 20% HEUR solids. Another 5 grams of each thickener sample were mixed with 20 gram mixtures of water and methyl-α-cyclodextrin at various concentrations to form solutions of 20% HEUR solids. The low shear viscosity of each resultant solution was measured using a Brookfield viscometer. The results, which are summarized in Table 4, demonstrate that the cyclodextrin suppressed the viscosity of the hydrophobically modified polyethoxylated urethane thickener having HDI chemistry better than the hydrophobically modified polyethoxylated urethane thickener made with Des W chemistry, whether the cyclodextrin used was methyl-β-cyclodextrin or methyl-α-cyclodextrin. The results also demonstrate that where Des W was used as the thickener urethane linker, methy-β-cyclodextrin was more efficient in viscosity suppression than methyl-α-cyclodextrin; while where HDI

TABLE 3

| | THICKENER VISCOSITY (cps) | | | THICKENER VISCOSITY (cps) | |
|---|---|---|---|---|---|
| METHYL-β-CD WT % | HEUR8 w/ DES W at 18% Solids (Ex 11) | HEUR9 w/ HDI at 18% Solids (Ex 12) | PrOH-β-CD WT % | HEUR8 w/ DES W at 18% Solids (Ex 13) | HEUR9 w/ HDI at 18% Solids (Ex 14) |
| 0.5 | | 20800 | 0.5 | | |
| 1 | | 9400 | 1 | | 45700 |
| 1.5 | | 5600 | 1.5 | | 31300 |
| 2 | 17300 | 3500 | 2 | | 21100 |
| 2.5 | 11100 | 2200 | 2.5 | 37400 | 17000 |
| 3 | 6650 | 1500 | 3 | 22600 | 13800 |
| 3.5 | 3100 | | 3.5 | 11200 | |
| 4 | 2500 | | 4 | 8400 | |
| 4.5 | 1200 | | 4.5 | 2050 | | was used as the thickener urethane linker, methyl-α-cyclodextrin was more efficient in viscosity suppression than methyl-β-cyclodextrin.

thickener that was synthesized using HDI as the urethane linker. The second sample, was a non-urethane type of hydrophobically modified associative thickener. Solutions of 20% solids thickeners were made by dissolving 5 grams of each thickener sample in 20 gram mixtures containing water and various cyclodextrins at various concentrations. The low shear viscosity of each resultant solution was measured using a Brookfield viscometer. The results were summarized in Table 6, demonstrating that the cyclodextrin suppressed the viscosity of the hydrophobically modified non-urethane associative thickener efficiently, with the degree of viscosity suppression efficiency varying depending upon the type of cyclodextrin

TABLE 4

| METHYL-β-CD WT % | THICKENER VISCOSITY (cps) | | METHYL-α-CD WT % | THICKENER VISCOSITY (cps) | |
|---|---|---|---|---|---|
| | HEUR10 w/ DES W at 20% Solids (Ex 15) | HEUR11 w/ HDI at 20% Solids (Ex 16) | | HEUR10 w/ DES W at 20% Solids (Ex 17) | HEUR11 w/ HDI at 20% Solids (Ex 18) |
| 1 | | 14300 | 1 | | 14100 |
| 2 | 17800 | 5400 | 2 | | 3350 |
| 3 | 8350 | 2550 | 3 | 13300 | 1600 |
| 4 | 2500 | | 4 | 2750 | |

EXAMPLE 19

Two hydrophobically modified polyethoxylated urethane (HEUR) thickener samples were used in the test. One of them was synthesized using Des W as the urethane linker, while the other one used HDI as the urethane linker. 42 lbs of a 20% HEUR solids solution of each thickener sample were mixed with a paint based on a 100 gallon formulation of Rhoplex™ SG-30 (an acrylic binder containing a surfactant, made by Rohm and Haas Company, Philadelphia, Pa.). Another 8.4 lbs of each thickener sample was mixed with 0.84 lbs of a 50% solution of methyl-β-cyclodextrin and 32.8 lbs of water, containing 1 wt % solution methyl-β-cyclodextrin, and then mixed with a paint based on a 100 gallon formulation of of Rhoplex™ SG-30. The efficiency of the thickener was determined by measuring KU viscosity and ICI viscosity. The high shear ICI viscosity of the paints was measured using an ICI Viscometer. The Stormer Viscosity was measured by using the Brookfield Viscometer.

The results, which are show in Table 5, show that the presence of cyclodextrin in the thickener solutions did not adversely affect the thickening efficiency of the thickener, or other properties of the paint formulation. The results also demonstrate that the complexation of the methyl-β-cyclodextrin with the thickener was reversible and that the surfactants present in the paint formulations were sufficient to decomplex the cyclodextrin from the thickener.

What is claimed is:

1. A method for providing a reduced viscosity thickener system for a polymer-containing aqueous system, the method comprising:
   a) providing a cyclodextrin-containing compound selected from the group consisting of alpha (α), beta (β), and gamma (γ) cyclodextrin having a hydrophobic cavity of a predetermined size;
   b) providing a hydrophobically modified aminoplast-ether copolymer thickener comprising at least one terminal phobe of a size capable of complexing with said hydrophobic cavity of said cyclodextrin-containing compound, wherein the lower limit of the solids content of the copolymer is 15 wt %; and
   c) mixing said cyclodextrin-containing compound provided in step (a) and said hydrophobically modified aminoplast-ether copolymer thickener provided in step (b), such that at least a portion of said cyclodextrin-containing compound of step (a) is complexed with said hydrophobically modified aminoplast ether thickener of step (b) in such a way that at least a portion of at least one of said phobes at least partially fills said cavity.

TABLE 5

| | Thickener: | | | |
|---|---|---|---|---|
| | HEUR12 w/ DES W | | HEUR13 w/ HDI | |
| | Thickener dry lbs: | | | |
| | 8.4 | 8.4 | 8.4 | 8.4 |
| | Me-?-CD wt %: | | | |
| | 0 (Comparative Ex 19) | 1 (Ex 20) | 0 (Comparative Ex 21) | 1 (Ex 22) |
| Stomer Viscosity (KU) | 99 | 96 | 93 | 90 |
| ICI Viscosity (poises) | 1.7 | 1.6 | 1.7 | 1.6 |
| Leneta Sag Resistance | 12 | 12 | 10 | 10 |
| Leneta Flow/Leveling | 9 | 9 | 10 | 10 |

EXAMPLE 20

Two hydrophobically modified associative thickener samples were used in the test. The first sample was a hydrophobically modified polyethoxylated urethane (HEUR)

2. The method according to claim 1, wherein the closer the size of said cyclodextrin-containing compound hydrophobic cavity is to the size of said at least one terminal phobe of said hydrophobically modified aminoplast-ether copolymer thickener, the higher the viscosity suppression efficiency of said cyclodextrin-containing compound, wherein said at least one terminal phobe of said hydrophobically modified aminoplast-ether copolymer thickener is not larger in size than said hydrophobic cavity of said cyclodextrin-containing compound.

3. A method for increasing the viscosity of a polymer-containing aqueous system, comprising mixing the reduced viscosity thickener system prepared according to claim 1 with:

a) a polymer-containing aqueous system, wherein said polymer is water-insoluble; and
b) a surfactant capable of decomplexing said cyclodextrin-containing compound from said hydrophobically modified aminoplast-ether copolymer thickener.

4. The method according to claim 1, wherein a solids content of the copolymer is 15 to 25 weight %.

5. The method according to claim 1, wherein a content of the cyclodextrin compound is 0.45 to 4.5 weight %.

6. The method according to claim 1, wherein the upper limit of the solids content of the copolymer is 25 wt %.

7. The method according to claim 1, wherein the upper limit of the solids content of the copolymer is 20 wt %.

8. The method according to claim 1, wherein the lower limit of the cyclodextrin content is 0.5 wt %.

9. The method according to claim 1, wherein the upper limit of the cyclodextrin content is 3.0 wt %.

10. The method according to claim 1, wherein the upper limit of the cyclodextrin content is 1.5 wt %.

11. The method according to claim 1, wherein the solids content of the copolymer is 20 wt % and the cyclodextrin content is 1.0 wt %.

12. The method according to claim 1, wherein the solids content of the polymer is 16 to 20 wt % and the cyclodextrin content is 3.0 wt %.

* * * * *